United States Patent [19]

Jackson et al.

[11] Patent Number: 5,509,329

[45] Date of Patent: Apr. 23, 1996

[54] CASING ASSEMBLY ADAPTED FOR EITHER MANUAL OR AUTOMATIC TRANSMISSIONS

[75] Inventors: Marc R. Jackson, Pickney; Joel M. Maguire, Dearborn; Thomas E. Diehl, Ann Arbor, all of Mich.

[73] Assignee: General Motors Corporation, Detroit, Mich.

[21] Appl. No.: 327,943

[22] Filed: Oct. 24, 1994

[51] Int. Cl.$^6$ .................................................. F16H 57/02
[52] U.S. Cl. .......................................... 74/606 R; 74/335
[58] Field of Search ................................ 74/606 R, 335

[56] References Cited

U.S. PATENT DOCUMENTS

| | | | |
|---|---|---|---|
| 4,226,200 | 10/1980 | Morisawa et al. | 74/606 R |
| 4,867,008 | 9/1989 | Yamaoka et al. | 74/606 R |
| 4,879,921 | 11/1989 | Asada et al. | 74/606 R X |
| 4,885,953 | 12/1989 | Sweetland et al. | 74/606 R |
| 5,195,399 | 3/1993 | Long et al. | |
| 5,295,413 | 3/1994 | Sherman | 74/606 R |

Primary Examiner—Rodney H. Bonck
Assistant Examiner—Peter Kwon
Attorney, Agent, or Firm—Donald F. Scherer

[57] ABSTRACT

A family of transmission assemblies is provided that includes both manual and automatic shifting versions. The family utilizes a casing assembly having an interchangeable central housing portion that will receive either a manual or an automatic transmission mechanism. Both the automatic and the manual transmissions utilize an input shaft member, an output shaft member, a countershaft member and a reverse/idler shaft member that are oriented along parallel operating axes and that are disposed in a geometric array which is common to both the automatic and the manual versions. The casing assembly has a central housing portion that has at least a front and rear opening, and a series of supporting axes—one for each of the operating axes defined by the shaft members that are common to both the automatic and the manual versions. The supporting axes are disposed in a geometric array that is congruent to the geometric array of said operating axes.

17 Claims, 16 Drawing Sheets

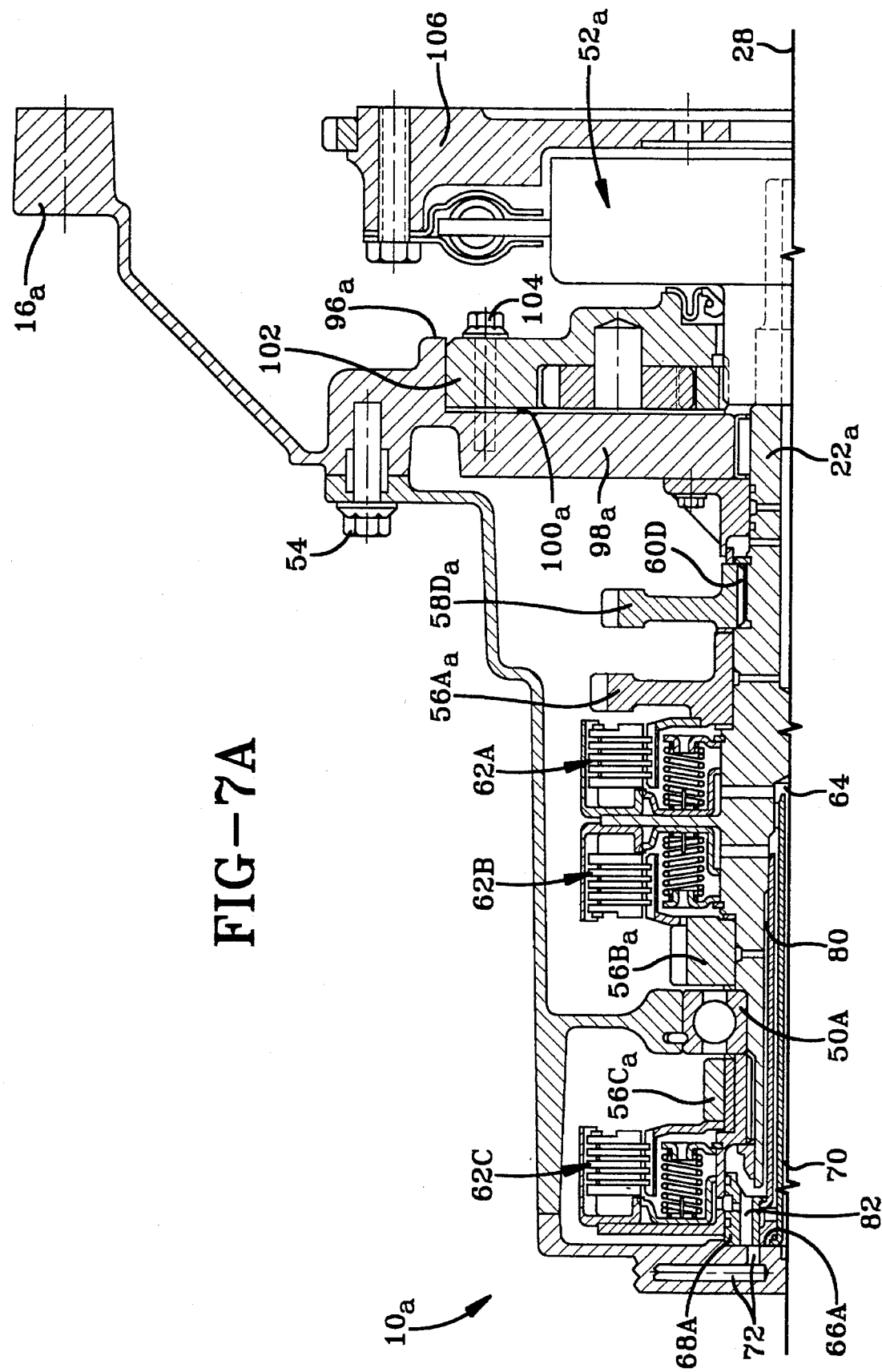

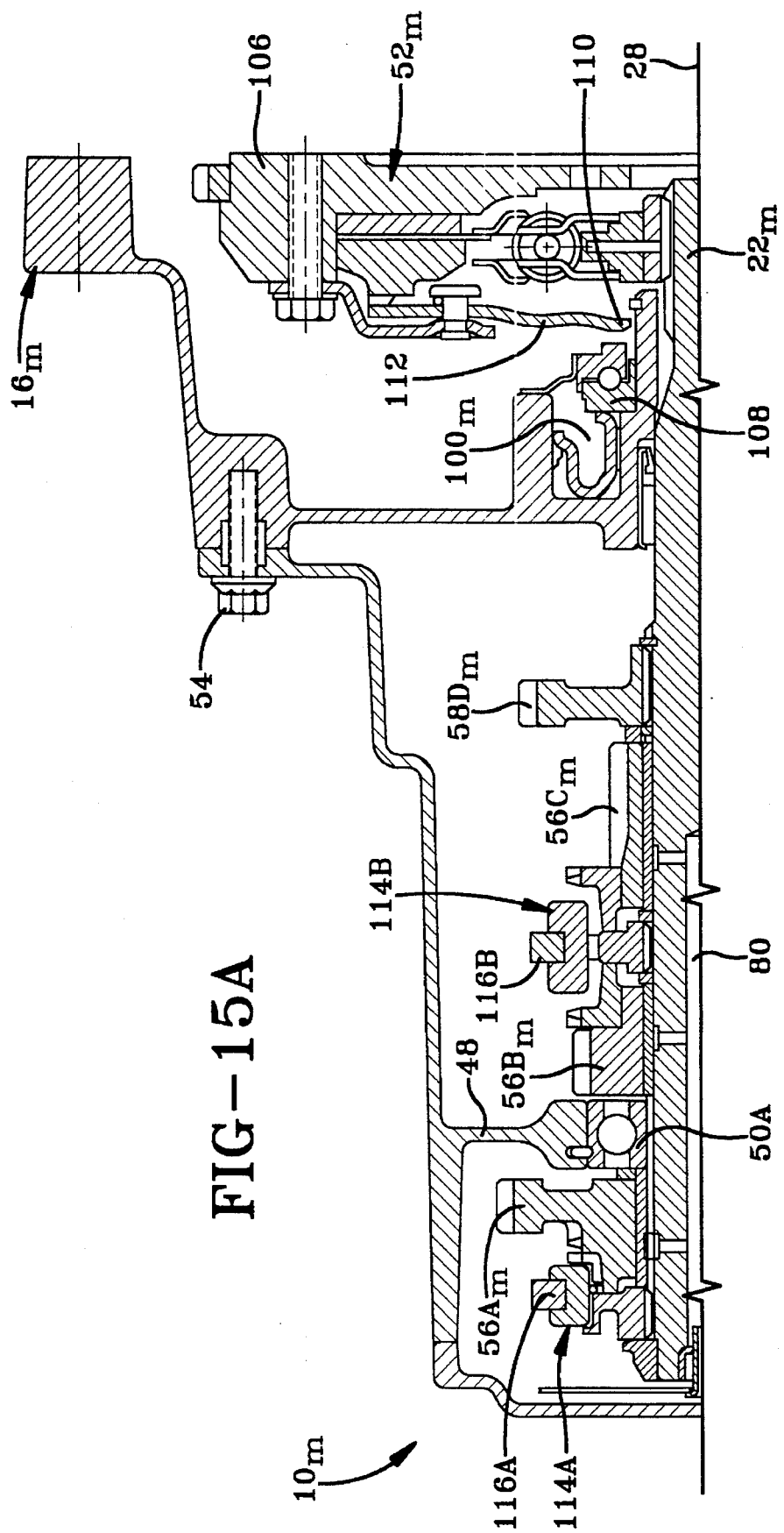

5,509,329

CASING ASSEMBLY ADAPTED FOR EITHER MANUAL OR AUTOMATIC TRANSMISSIONS

TECHNICAL FIELD

The present invention relates generally to vehicular transmission assemblies. More particularly, the present invention relates to a family of transmission assemblies, both manual and automatic versions, the supporting shaft components of which are oriented along parallel axes in a geometric array common to both versions. Specifically, the present invention relates to a family of manual and automatic vehicular transmission assemblies which are configured to be received in a virtually interchangeable transmission case assembly.

BACKGROUND OF THE INVENTION

For many years, passenger automobiles and light trucks have been offered by manufacturers with the selection of either manual or automatic transmission systems. Traditionally, automatic and manual transmissions have been fabricated in two separate manufacturing facilities, each of which is provided with at least some equipment that is dedicated to the manufacture of that type transmission. In addition to the dedicated equipment, each facility is required to maintain an "over-capacity" in order effectively to handle fluctuations in consumer demand for the version of the transmission manufactured at that facility. Therefore, the combined capacity of the two facilities exceeds the reasonably anticipated overall demand volume.

Typically, dedicated manufacturing operations—i.e.: those having virtually no flexibility and being dedicated to the production of one specific part or assemblage of parts— are more cost-effective than modestly flexible operations. In fact, experience has shown that flexible processing is impractical unless a high degree of flexibility is required. Factors which, when appropriate, suggest the need for highly flexible manufacturing facilities include: the need to cope with products and processes that are normally upgraded or routinely changed over time; and, the space and personnel requirements attendant upon the use of a dedicated rather than a flexible manufacturing facility are burdensome.

In addition, the need to maintain over-capacity ability at more than one dedicated facility is a chief factor contributing to the need for a consolidated, flexible manufacturing facility. Clearly, a flexible assembly line for providing both manual and automatic transmission systems would have a significant cost advantage over providing those systems at two separate, dedicated facilities, particularly when either, or both, must maintain an over-capacity capability.

Accordingly, it has been desired to develop a more flexible manufacturing system which is capable of producing any mix of automatic and manual transmissions to meet the demand-volume without the need to maintain over-capacity facilities, but a major stumbling block in the development of a flexible facility for the assembly of manual and automatic transmissions has been the extensive differences between the conventional configurations of manual and automatic transmission systems. Such differences exist with respect to case length, end-cover geometry, center distances between operating shafts (and the resulting bearing bore locations), bell housing lengths, clutch/synchronizer arrangements, and the transmission controls, to name but a few. Thus, it can be seen that one is faced with a monumental task to develop a flexible system which would be capable of handling a mix of manual and automatic transmissions.

SUMMARY OF THE INVENTION

It is, therefore, a primary object of the present invention to provide a family of manual and automatic transmission assemblies, the transmission mechanisms of which are disposed in a common arrangement that permits them to be housed within an interchangeable central housing portion of a casing assembly.

It is another object of the present invention to provide a family of transmission assemblies, as above, that can not only be housed in the central housing portion of a casing assembly but can also be manufactured with a majority of identical machining operations to employ a significant number of interchangeable components.

It is a further object of the present invention to provide a family of transmission assemblies, as above, that are specifically engineered toward an integrated configuration which permits both manual and automatic versions to be effectively produced in a flexible assembling facility that is capable of producing competitively priced transmission assemblies in low volume, as well as allowing rapid changeover in response to market share demand variations between the two versions.

It is still another object of the present invention to provide a family of transmission assemblies, as above, which reduces fuel consumption, allows improved packaging, provides improved performance and reduces production costs and weight while contributing to high-driving comfort with respect to conventional transmission systems.

These and other objects of the invention, as well as the advantages thereof over existing and prior art forms, which will be apparent in view of the following derailed specification, are accomplished by means hereinafter described and claimed.

In general, an improved transmission assembly embodying the concepts of the present invention employs a casing assembly, the central housing portion of which is adapted to receive a vehicular transmission mechanism selected from a family of automatic and manual versions having at least an input shaft member, an output shaft member, a countershaft member and a reverse/idler shaft member that are oriented along parallel operating axes and that are disposed in a geometric array which is common to both the automatic and the manual versions of the transmission mechanism. The central housing portion of the casing assembly is a shell that has at least an input supporting axis, an output supporting axis, a countershaft supporting axis and a reverse/idler supporting axis. The supporting axes are disposed in a geometric array that is congruent with the geometric array of the correspondingly located operating axes of both the manual and the automatic versions of the transmission mechanism.

To acquaint persons skilled in the arts most closely related to the present invention, one preferred embodiment of a casing assembly which will interchangeably accept manual or automatic transmission mechanisms and which illustrates a best mode now contemplated for putting the invention into practice is described herein by, and with reference to, the annexed drawings that form a part of the specification. An exemplary transmission assembly incorporating the casing assembly is described in detail without attempting to show all of the various forms and modifications in which the invention might be embodied. As such, the embodiment shown and described herein is illustrative and, as will become apparent to those skilled in these arts, can be modified in numerous ways within the spirit and scope of the invention; the invention being measured by the appended claims and not by the details of the specification.

BRIEF DESCRIPTION OF THE DRAWINGS

FIG. 2 is, therefore, taken substantially along line 2—2 of FIG. 3;

FIG. 7A is an enlarged area of FIG. 6, that area being outlined on FIG. 6 with a chain-line and being designated "SEE FIG. 7A";

FIG. 10 is, therefore, taken substantially along line 10—10 of FIG. 11;

FIG. 15A is an enlarged area of FIG. 14, that area being outlined on FIG. 14 with a chain-line and being designated "SEE FIG. 15A";

DESCRIPTION OF AN EXEMPLARY EMBODIMENT

Figure 15B:
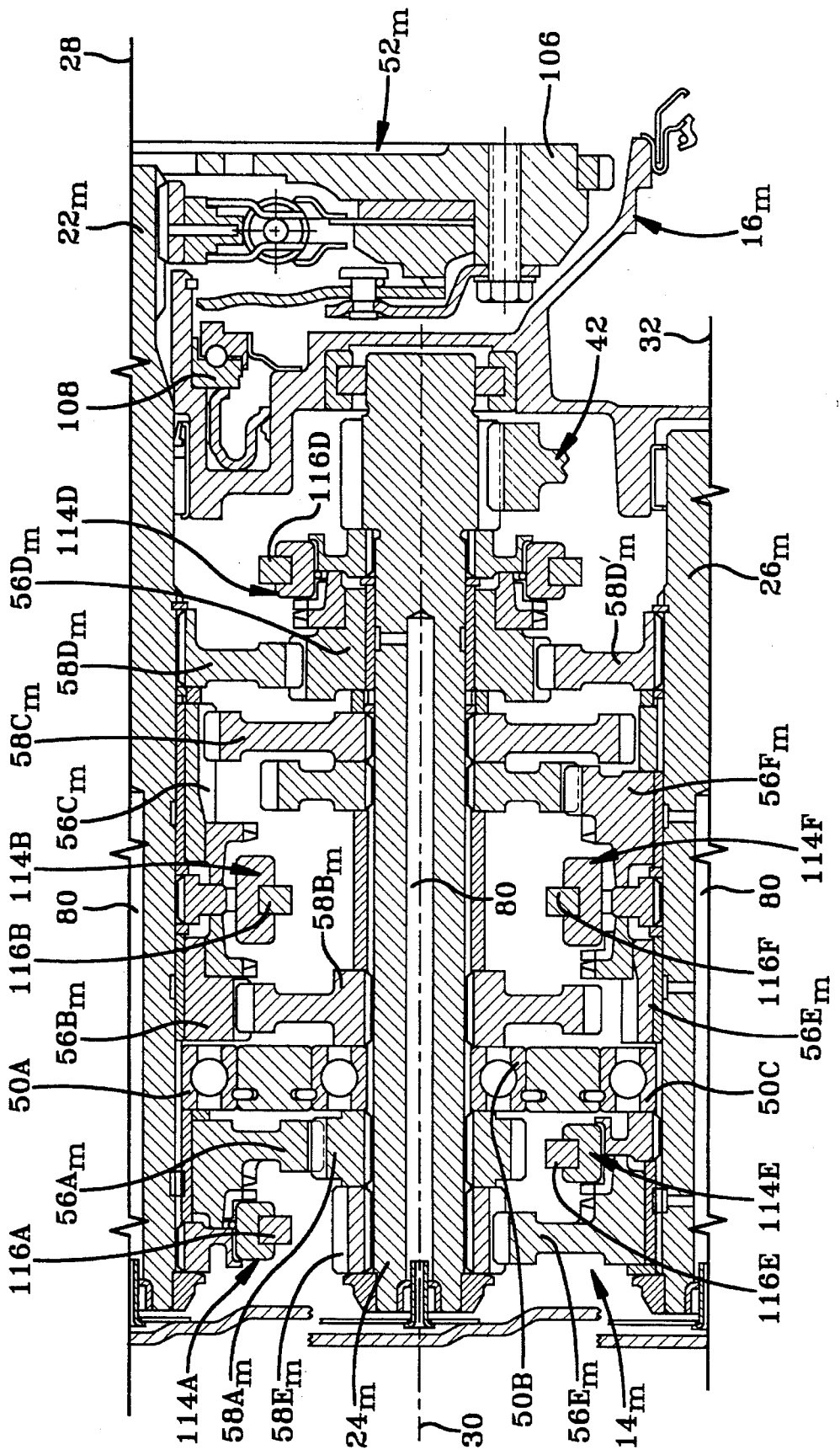
FIG. 15B is also an enlarged area of FIG. 14, that area being outlined on FIG. 14 with a chain-line and being designated "SEE FIG. 15B"
Figure 15C:
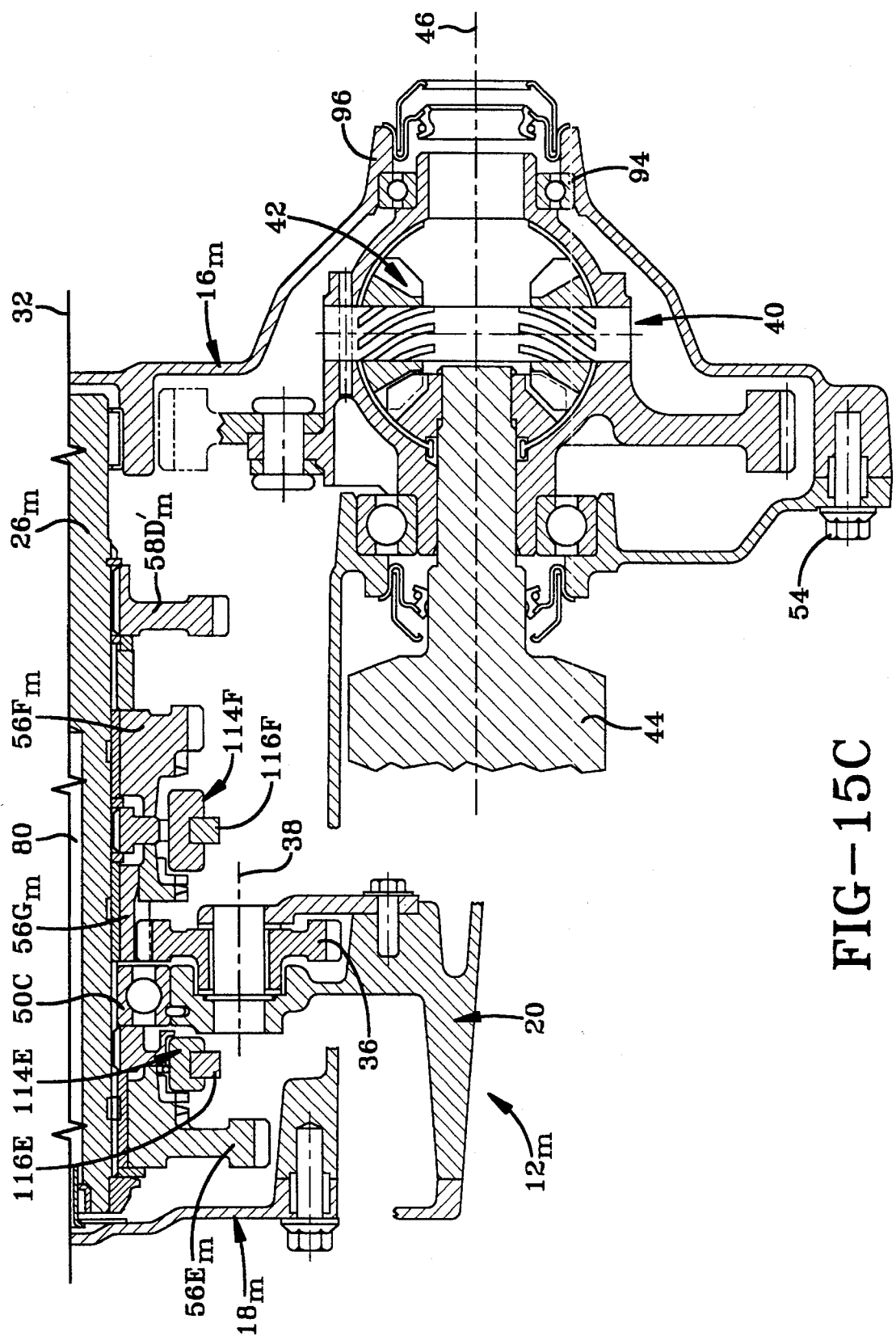
FIG. 15C is also an enlarged area of FIG. 14, that area being outlined on FIG. 14 with a chain-line and being designated "SEE FIG. 15C"; and, FIG. 16 is a view similar to FIG. 14, but depicting the transmission casing with the internal transmission mechanism having been removed.
Figure 16:
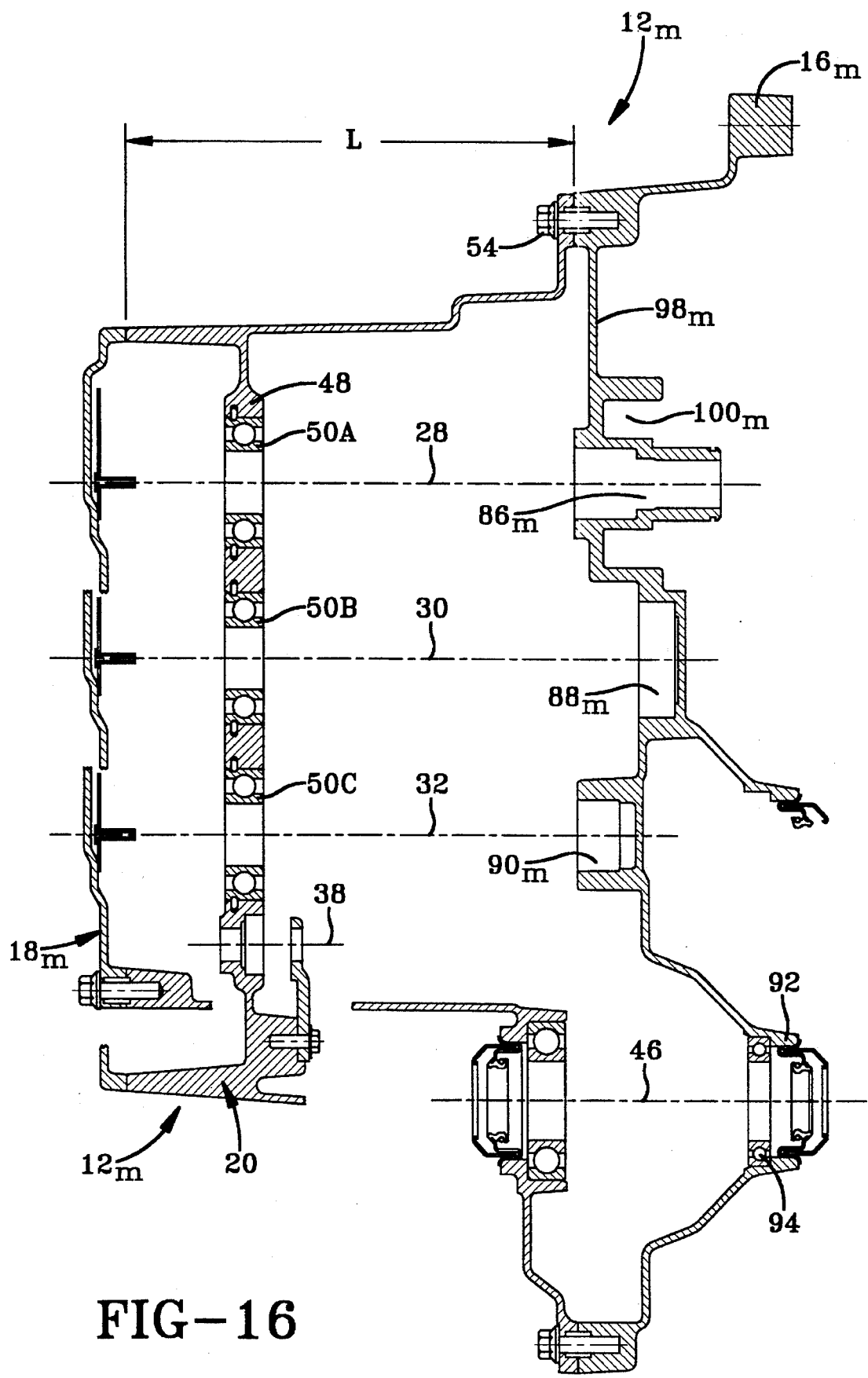

Two representative forms of a transmission assembly embodying the concepts of the present invention are designated generally by the numeral 10 on the accompanying drawings. As can best be seen in FIGS. 7 and 15, the transmission assembly 10 is comprised generally of a casing assembly 12 and the operating members of the transmission mechanism 14, irrespective of whether the transmission assembly 10 incorporates an automatic transmission mechanism $14_a$ (in which event it is a transmission assembly $10_a$) or a manual transmission mechanism $14_m$ (in which event it is a transmission assembly $10_m$). Either version of the transmission mechanism 14 is received within a casing assembly 12. The casing assembly 12 may include both a frontal bell housing cover 16 and a rear cover 18 that are demountably secured to an interchangeable central housing portion 20 (FIGS. 8 and 16).

The primary, novel aspect of the present invention lies in the structural arrangement that permits a casing assembly that employs a central housing portion 20 having a single configuration to be utilized in conjunction with a sufficient multiplicity of common components in both a manual and an automatic transmission mechanism such that either transmission mechanism may be operatively mounted in at least a common central housing portion of a casing assembly. It will, therefore, be necessary to describe much of the invention in terms of those structural elements which are common in both the manual and the automatic transmission mechanisms. In the description that follows, such elements will be designated by the same numerical identifier, irrespective of whether that structural component is being used with a manual or an automatic transmission mechanism.

As previewed in the introductory overview of an exemplary embodiment—two paragraphs previous—a description of those elements that are unique to one version or the other will also be necessary in order to explain the adaptability of the common elements. Thus, when one or more of the structural members, components or arrangements identified in one version have been modified, or altered, from its corresponding structural member, component or arrangement in the other version, a letter subscript will be employed in combination with the numerical designation employed for general identification of that structural member, component or arrangement. Specifically, and as has already been employed, the subscript "a" will be used to designate components modified, or altered, for use with automatic transmission mechanisms, and the subscript "m" will be used to designate components modified, or altered, for use with manual transmission mechanisms.

It must also be understood that a particular structural member, component or arrangement may be employed at more than one location. When referring generally to that type of structural member, component or arrangement, a common numerical designation shall be employed. However, when one of the structural members, components or arrangements so identified is to be individually identified, it shall be referenced by virtue of a letter suffix employed in combination with the numerical designation employed for general identification of that structural member, component or arrangement.

The foregoing alphanumeric conventions shall be employed throughout the specification.

Returning to the specific description of an exemplary embodiment, either version of the transmission mechanism $14_a$ (FIG. 6) or $14_m$ (FIG. 14) requires an input shaft $22_a$ or $22_m$ suitable to the version under consideration. Likewise, an output shaft $24_a$ or $24_m$ and a countershaft $26_a$ or $26_m$ are employed in each respective version. The rotational operating axes 28, 30 and 32 of the respective shafts 22, 24 and 26 are oriented in parallel relation and are disposed in a common geometric array 34 (as best seen in FIGS. 1, 2, 9 and 10).

Figure 3:
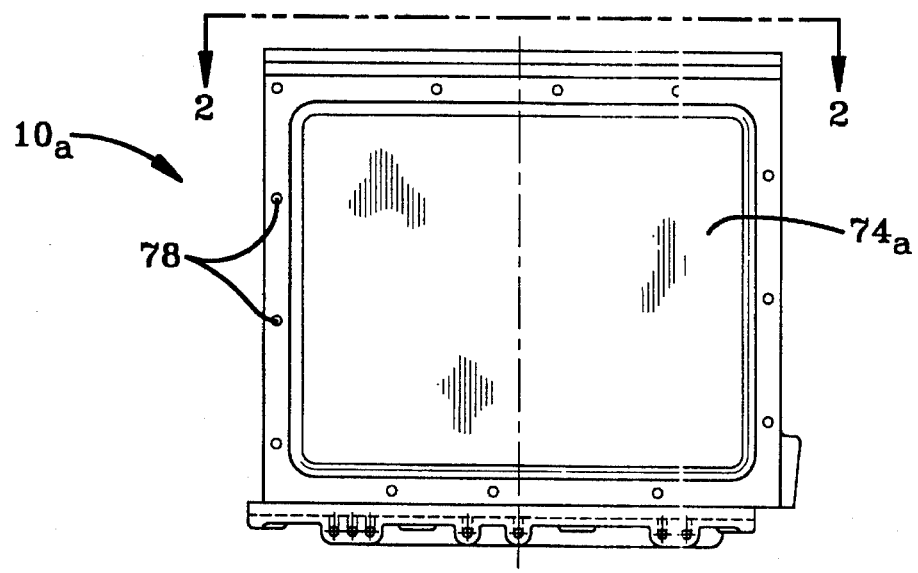
FIG. 3 is a top plan view of the transmission assembly depicted in FIGS. 1 and 2, said plan view being taken substantially along line 3—3 of FIG. 1 and appearing on the same sheet of drawings as FIG. 1.
Figure 1:
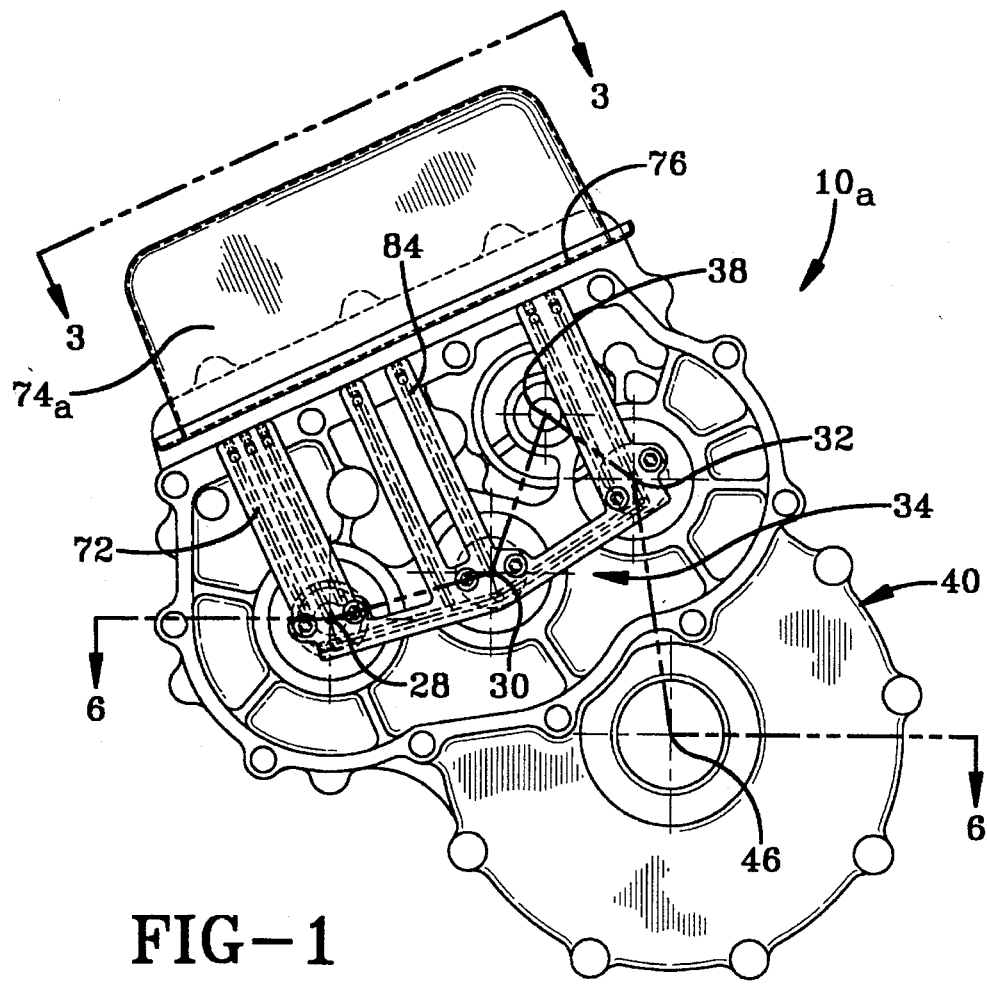
FIG. 1 is a rear elevational view of an automatic version of a transmission assembly embodying the concepts of the present invention.
Figure 2:
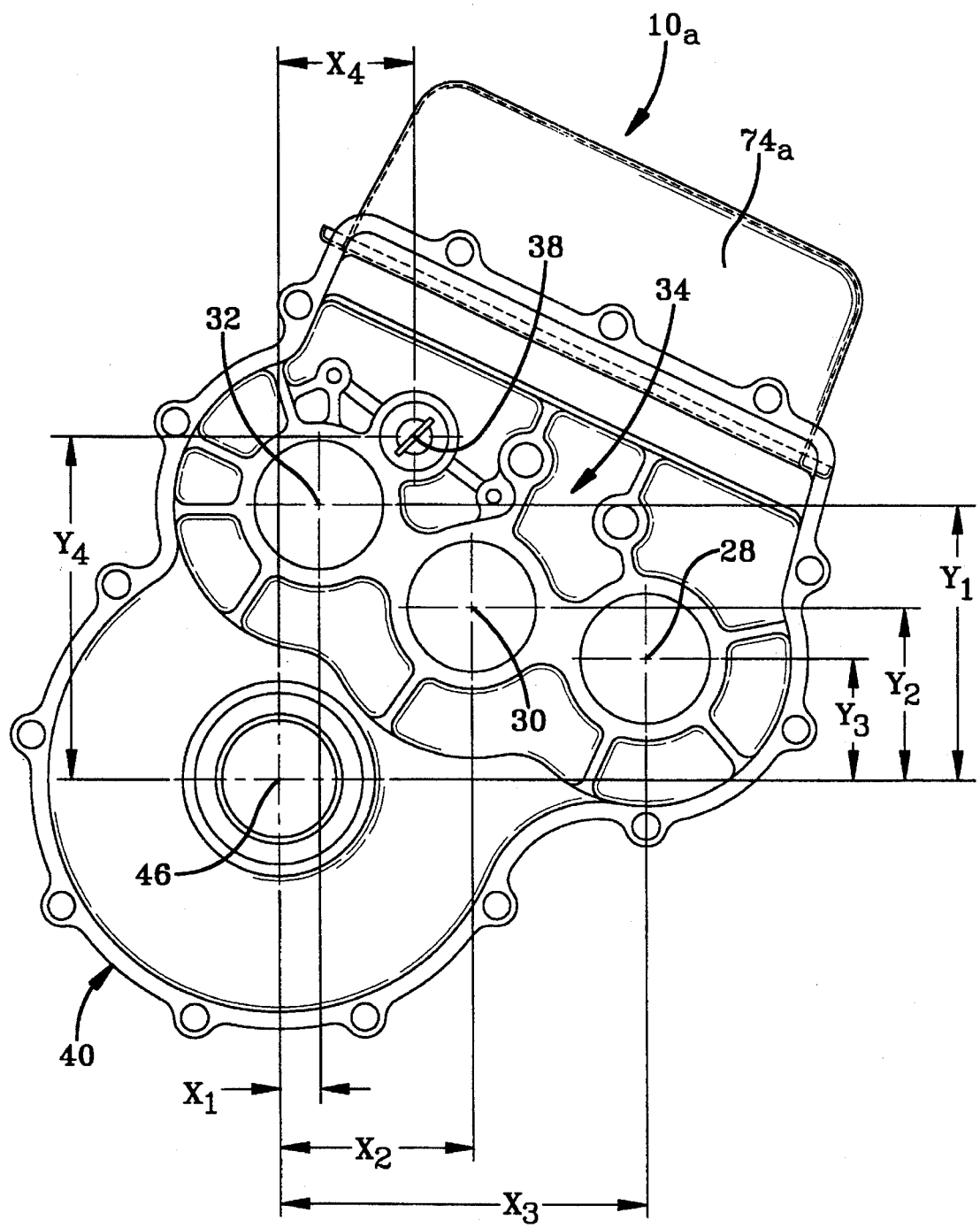
FIG. 2 is a front elevation of the transmission assembly depicted in FIG. 13—for reference.
Figure 4:
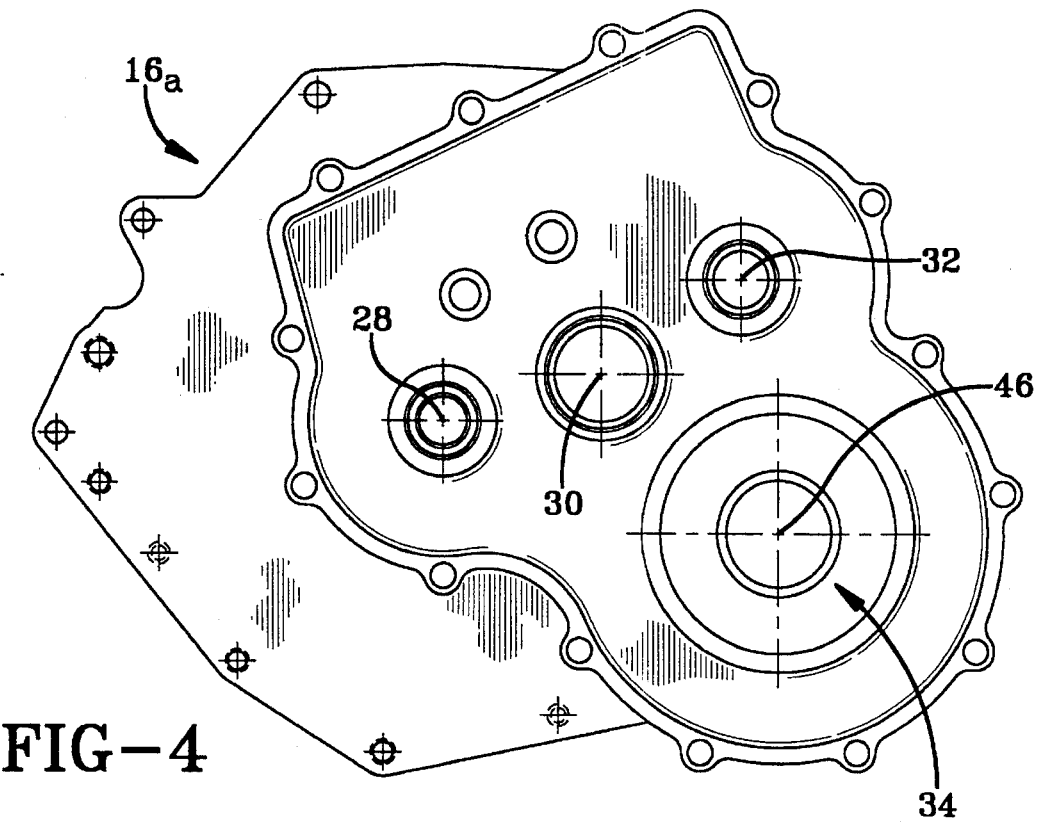
FIG. 4 is a rear elevation of the bell housing portion of the casing assembly embodying the concepts of the present invention and depicted in the configuration employed in conjunction with the automatic version of the transmission.
Figure 5:
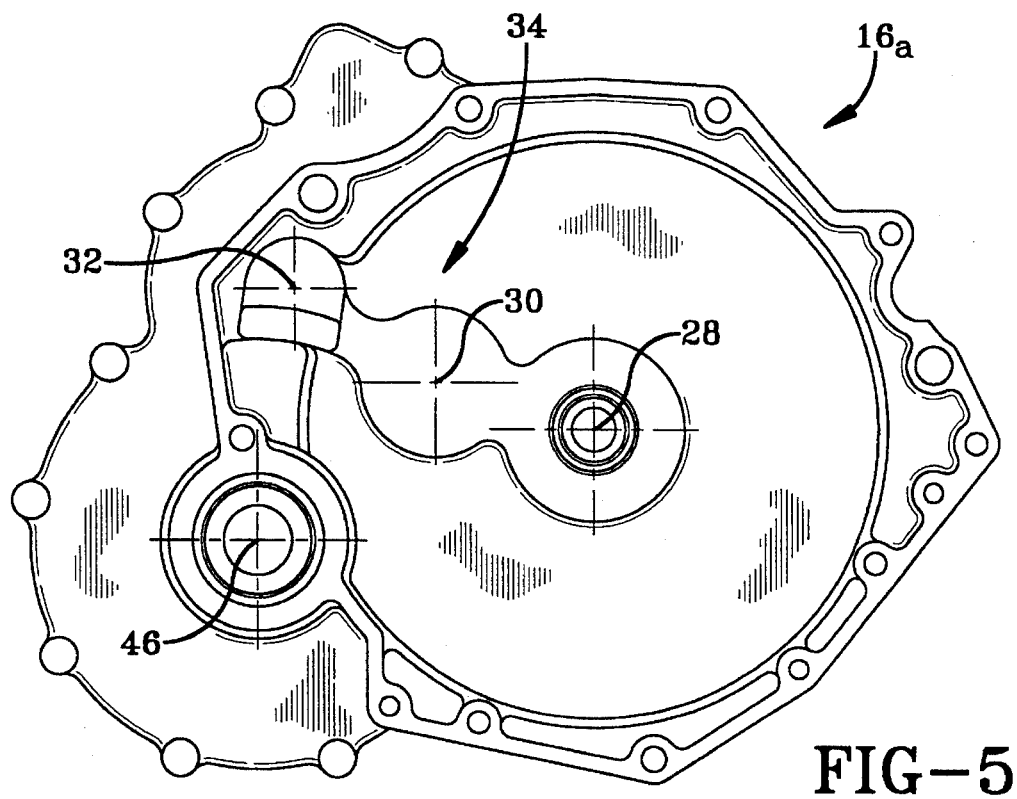
FIG. 5 is a front elevation of the bell housing depicted FIG. 4.
Figure 6:
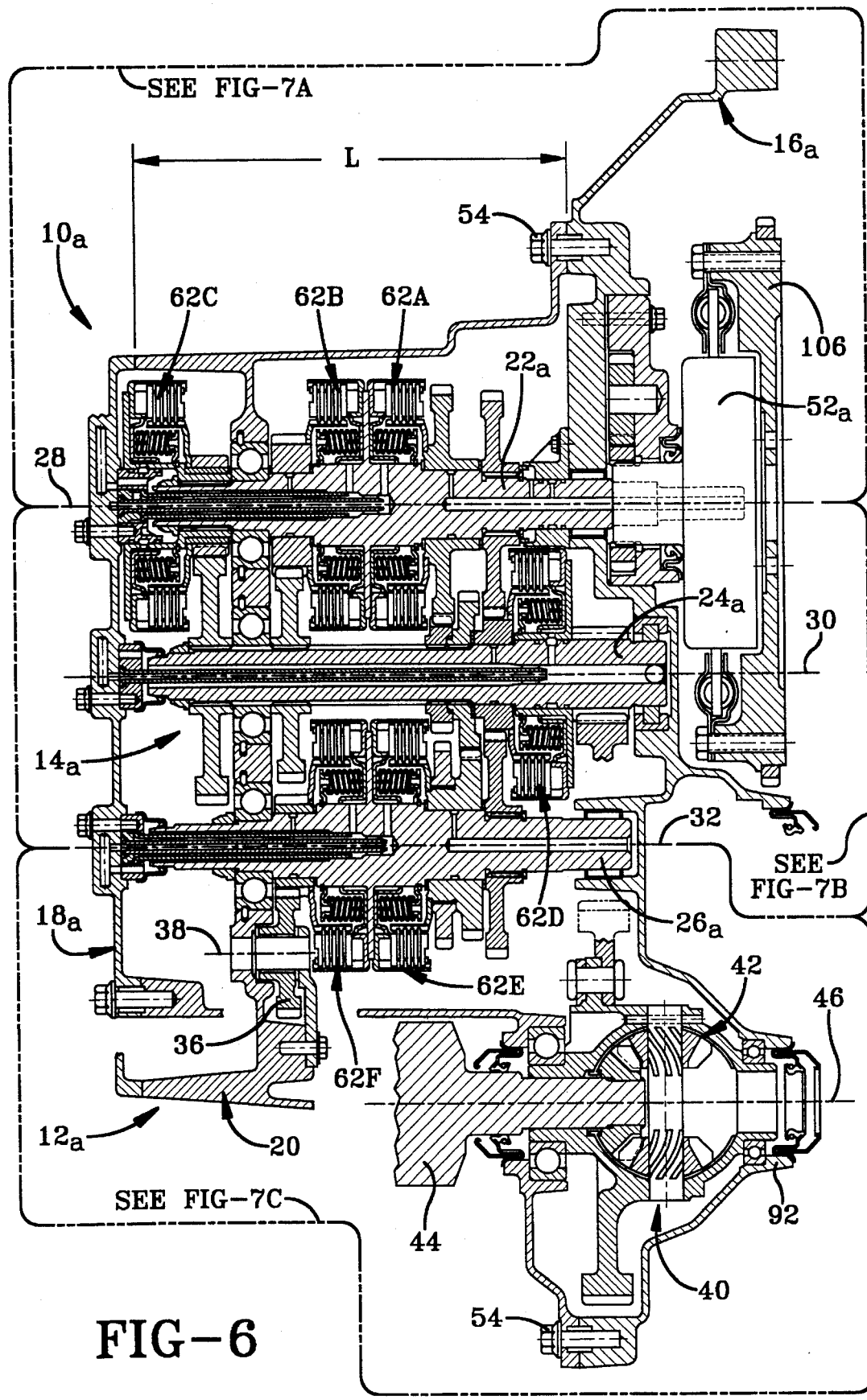
FIG. 6 is an enlarged, cross-sectional view taken substantially along line 6—6 of FIG. 1
Figure 14:
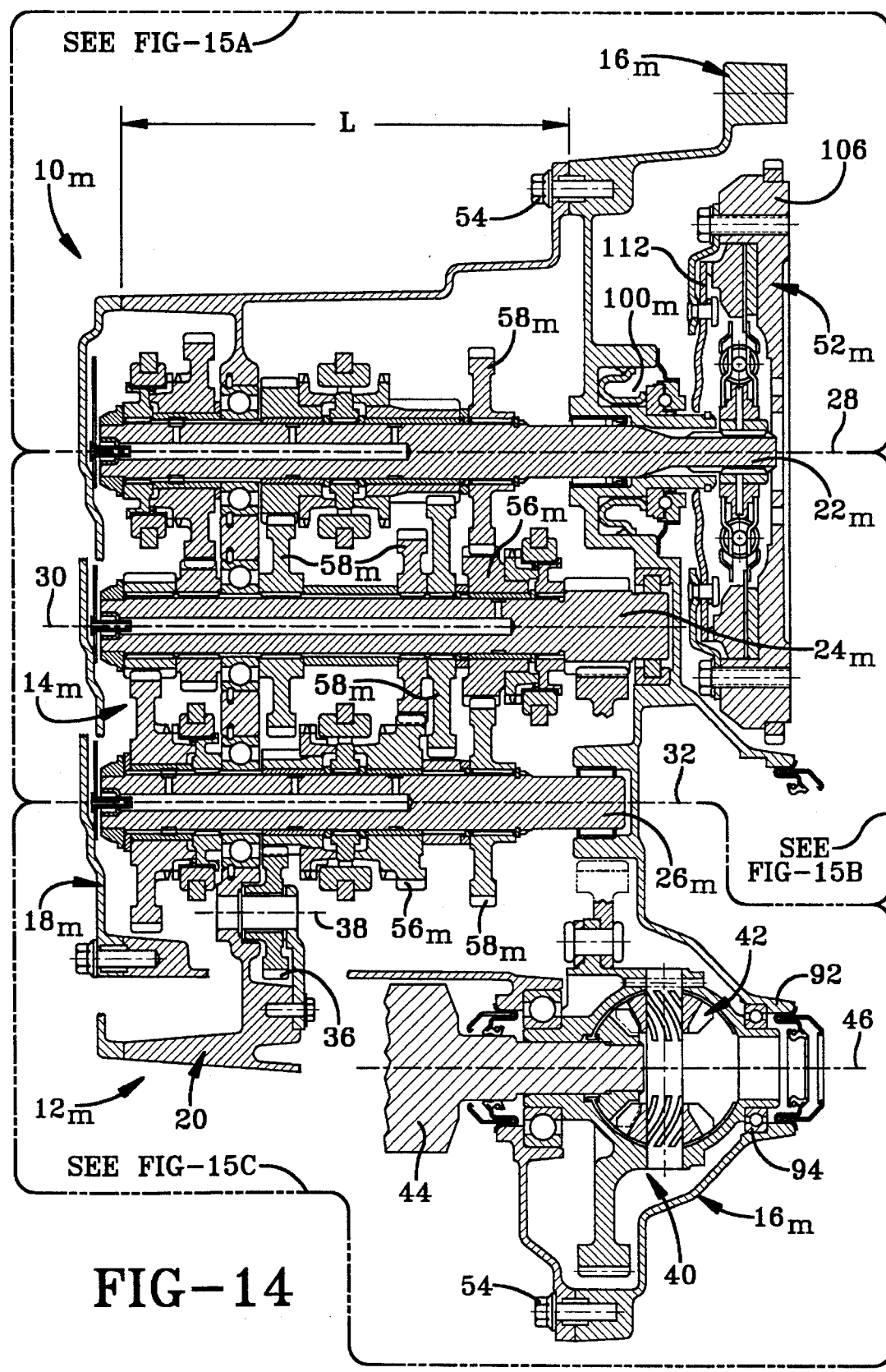
FIG. 14 is an enlarged, cross-sectional view taken substantially along line 14—14 of FIG. 9.

Either version of the transmission mechanism $14_a$ or $14_m$ may also include a reverse/idler gear 36 that rotates about an operating axis 38 that is also preferably included in the array 34. Either or both transmission assemblies $10_a$ or $10_m$ may also include, or be closely associated with, a differential assembly 40, such as depicted in FIG. 6 in conjunction with transmission mechanism $14_a$ and as depicted in FIG. 14 in conjunction with transmission assembly $14_m$. As such, the central housing portion 20 may be configured to receive the differential mechanism 42, as is represented on the drawings. To complete this overview of the exemplary structure embodying the concepts of the present invention, it will only be necessary to understand that the differential output, as represented by shaft 44, is preferably oriented along an operating axis 46 which is also properly included within the geometric array 34.

The array 34 delineated by the rotational operating axes 28, 30, 32, 38 and 46 in either transmission mechanism $14_a$ or $14_m$ can be identified and located by the Cartesian coordinates measured parallel to the "X" and "Y" axes that are disposed transversely and perpendicularly to the previously identified operating axes. For convenience, the origin of the coordinate system may be collocated along the operating axis 46 of the differential output shaft 44. As such, the array 34 location of the countershaft operating axis 32 may be defined by an abscissa $X_1$ and an ordinate $Y_1$ on FIGS. 2 and 10. With continued reference to FIGS. 2 and 10, the array location of the output shaft operating axis 30 may be defined by an abscissa $X_2$ and an ordinate $Y_2$. Similarly, the array location of the input shaft operating axis 28 may be defined by the coordinates $X_3$ and $Y_3$, and the array location of the reverse/idler operating axis 38 may be defined by the coordinates $X_4$ and $Y_4$.

The specific values of the various abscissa and ordinates is not critical to the invention, except that the dimensions of the specific coordinates must be equal in any family of transmission mechanisms 14 to be housed in a casing assembly $12_a$ or $12_m$ embodying a common central housing portion 20.

Those skilled in the vehicular transmission art will recognize that the configuration and operation of component parts with respect to each version of the transmission mechanism—i.e.: manual or automatic—is very similar to conventional multi-speed countershaft transmissions. For that reason, the description which follows is not intended to set forth a detailed explanation of such conventional systems, but to delineate how such component parts may be adapted for common utilization in both manual and automatic transmission mechanisms so as to be receivable in a casing assembly embodying the concepts of the present invention. An added benefit is that by the use of numerous components that are common to both the manual and the automatic transmission mechanisms, common manufacturing processes and equipment may be advantageously employed.

The central housing portion 20 of the casing assembly $12_a$ or $12_m$ (FIGS. 8 and 16, respectively) has a transverse web wall 48 that is bored along the operating axes 28, 30 and 32 to receive the main support bearings 50 for each of the corresponding shafts. Specifically, the main support bearing 50A is located to circumscribe operating axis 28; main support bearing 50B is located to circumscribe operating axis 30; and, main support bearing 50C is located to circumscribe operating axis 32.

Either version of the transmission assembly 10 further includes an input clutch 52 that is operatively interposed between the input shaft 22 and the output of the engine. With specific reference to FIG. 6, wherein the automatic version of the transmission assembly $10_a$ is depicted, it can be seen that one end of the input shaft $22_a$ extends outside the central housing portion 20 of the casing assembly $12_a$ and into the frontal bell housing cover $16_a$. As shown, the bell housing cover $16_a$ may be demountably secured to the central housing portion 20 of the casing assembly $12_a$, as by fastening means in the nature of machine bolts 54. The input clutch $52_a$ is located within the bell housing portion $16_a$ and is operatively connected to the input shaft $22_a$. Those skilled in the art will recognize that the automatic transmission mechanism $14_a$ may employ starting clutch technology—as represented by the input clutch $52_a$ —in lieu of more conventional torque converter technology, to transmit power from the source—i.e.: the engine—to the transmission assembly 10. The input clutch $52_a$, and the mechanism operatively associated therewith, will be more fully hereinafter discussed in conjunction with the description of the bell housing cover $16_a$.

With specific reference to FIG. 14, wherein the manual version of the transmission assembly $10_m$ is depicted, it can be seen that one end of the input shaft $22_m$ extends outside the central housing portion 20 of the casing assembly $12_m$ and into the frontal bell housing cover $16_m$. As shown, the bell housing cover $16_m$ may also be demountably secured to the central housing portion 20 of the casing assembly $12_m$, as by fastening means in the nature of machine bolts 54. The input clutch $52_m$ is located within the bell housing cover $16_m$ and is operatively connected to the input shaft $22_m$, as will also be more fully hereinafter described in conjunction with a description of the bell housing cover $16_m$.

Figure 7B:
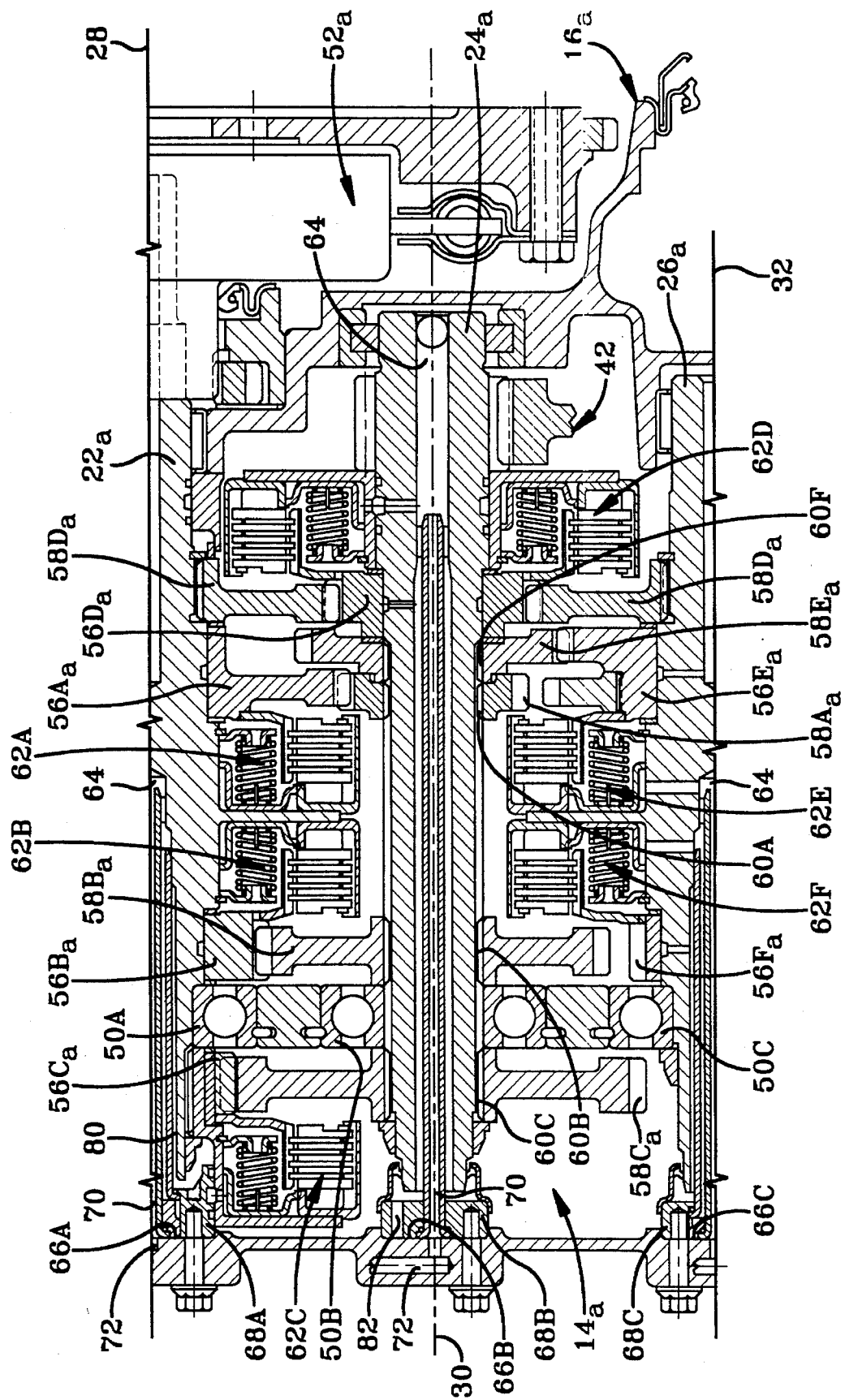
FIG. 7B is also an enlarged area of FIG. 6, that area being outlined on FIG. 6 with a chain-line and being designated "SEE FIG. 7B"
Figure 7C:
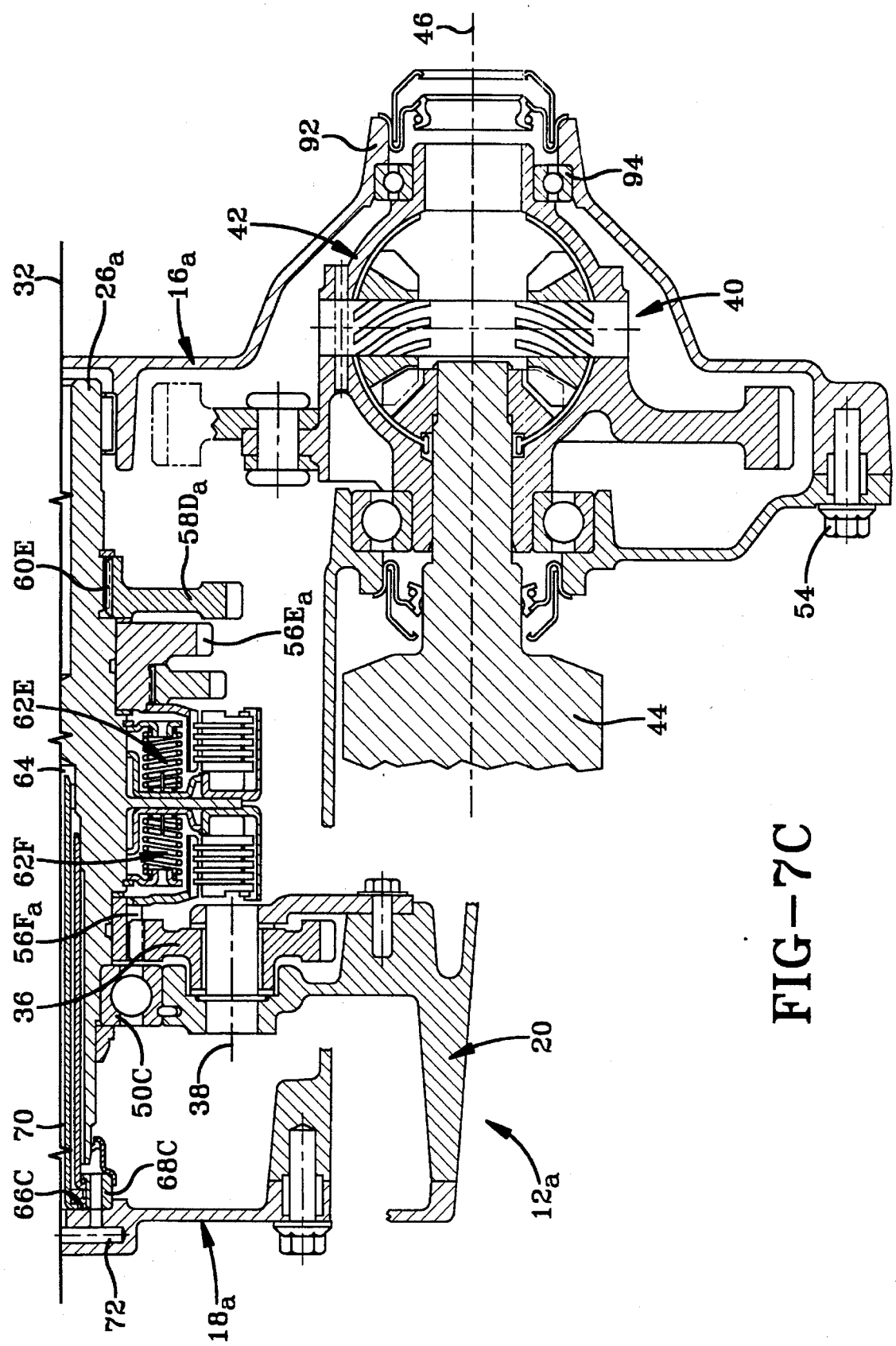
FIG. 7C is also an enlarged area of FIG. 6, that area being outlined on FIG. 6 with a chain-line and being designated "SEE FIG. 7C"
Figure 8:
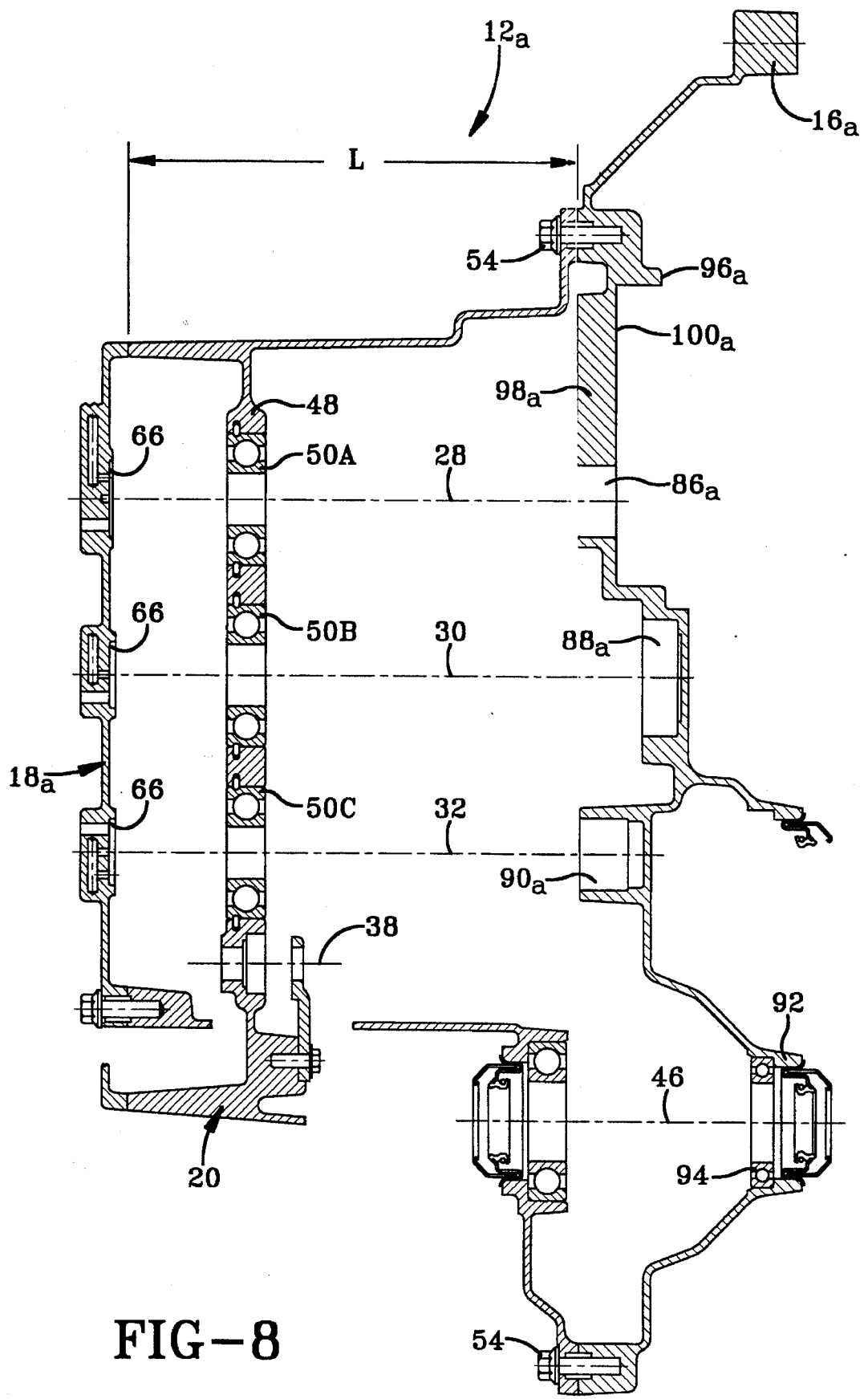
FIG. 8 is a view similar to FIG. 6 but depicting the transmission casing assembly with the internal transmission mechanism having been removed.
Figure 11:
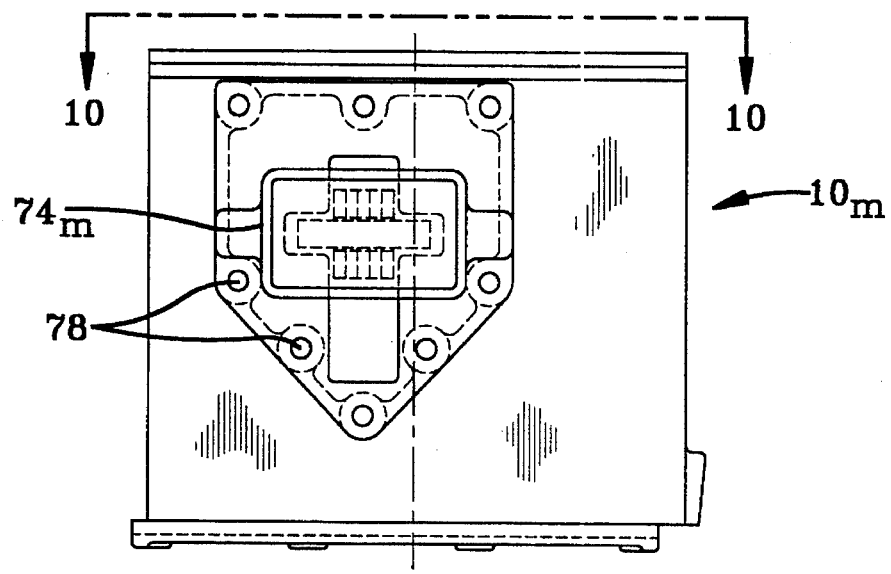
FIG. 11 is a top plan view of the transmission assembly depicted in FIGS. 9 and 10, said plan view being taken substantially along line 11—11 of FIG. 9 and appearing on the same sheet of drawings as FIG. 9.
Figure 9:
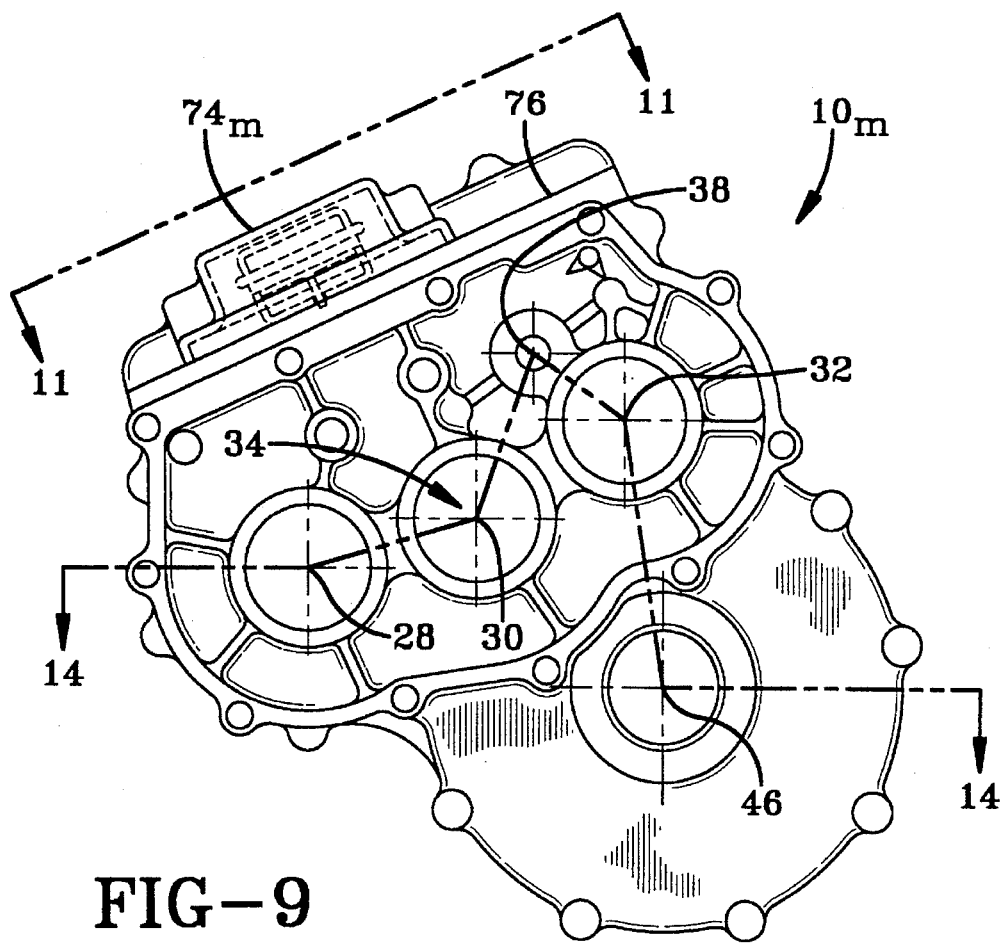
FIG. 9 is a rear elevational view similar to FIG. 1 but depicting a manual version of a transmission assembly embodying the concepts of the present invention.
Figure 10:
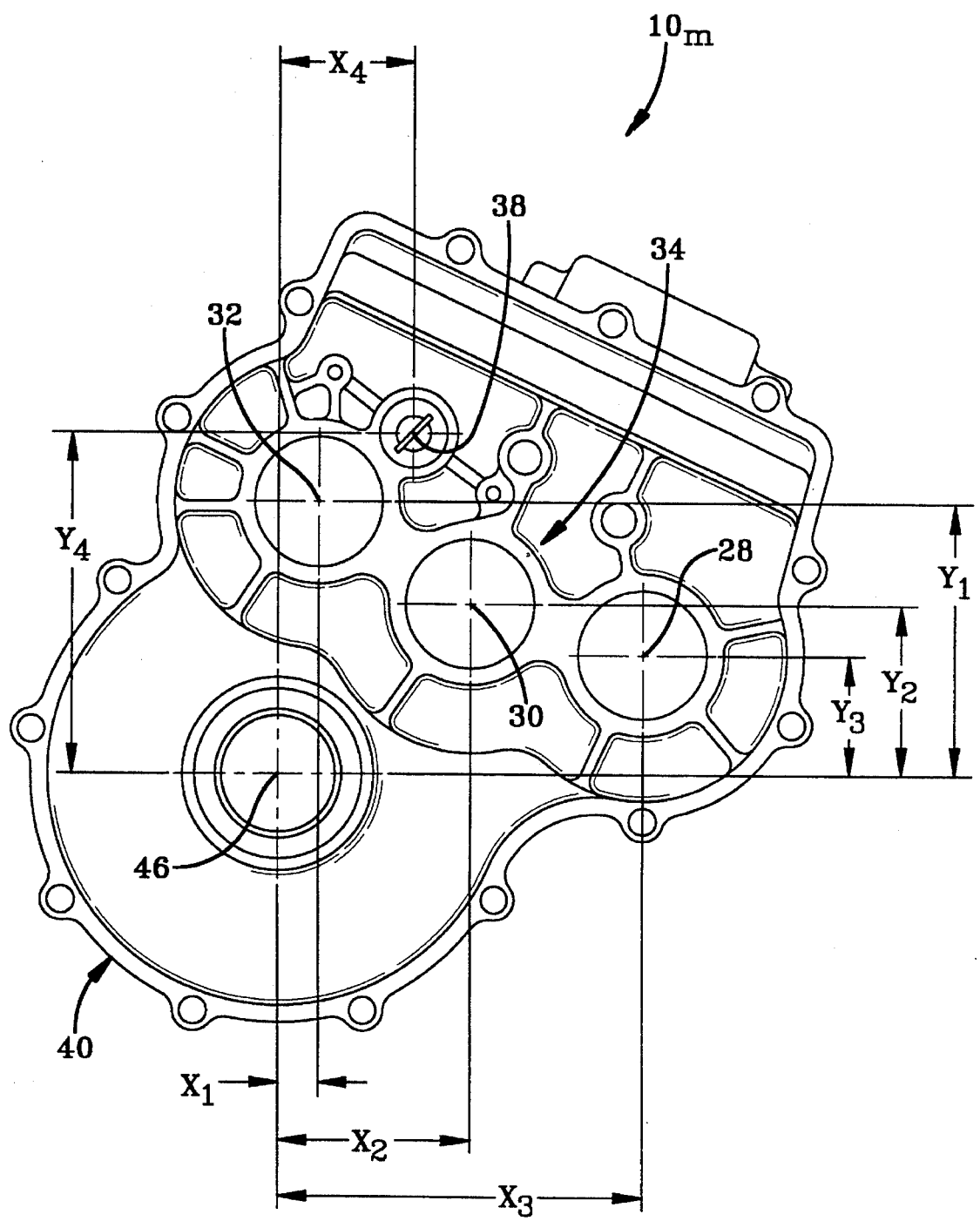
FIG. 10 is a front elevation of the transmission assembly depicted in FIG. 9—for reference.
Figure 12:
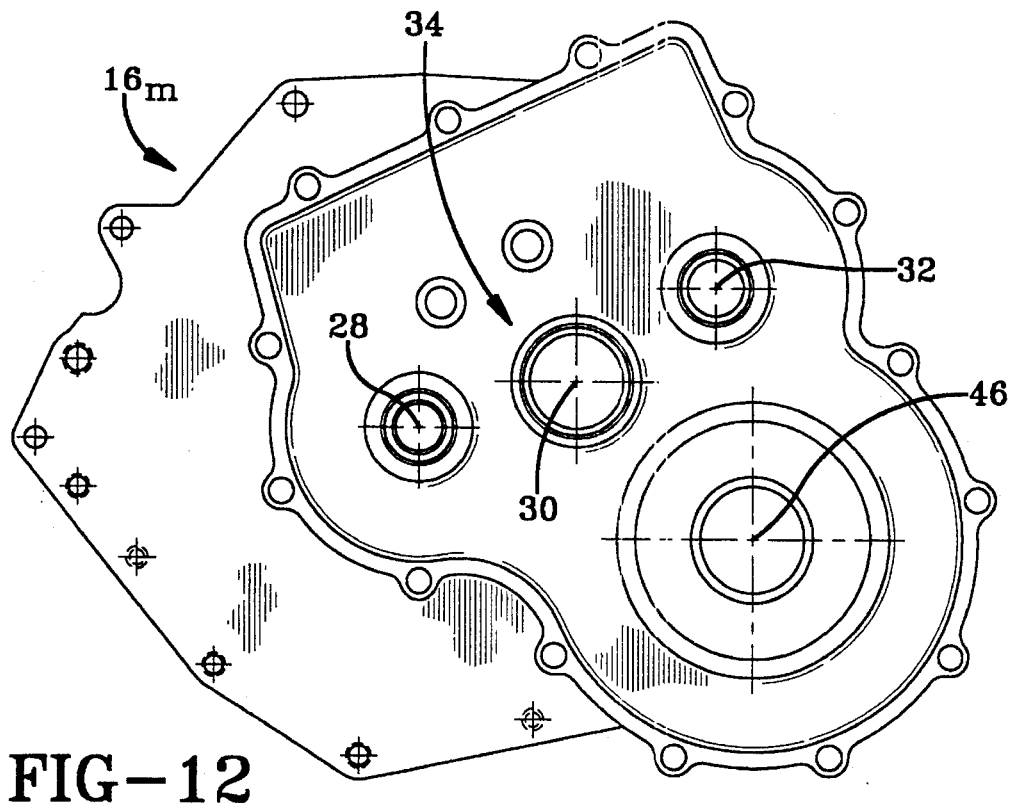
FIG. 12 is a rear elevation of the bell housing portion of the casing assembly embodying the concepts of the present invention, and depicted in the configuration employed in conjunction with the manual version of the transmission.
Figure 13:
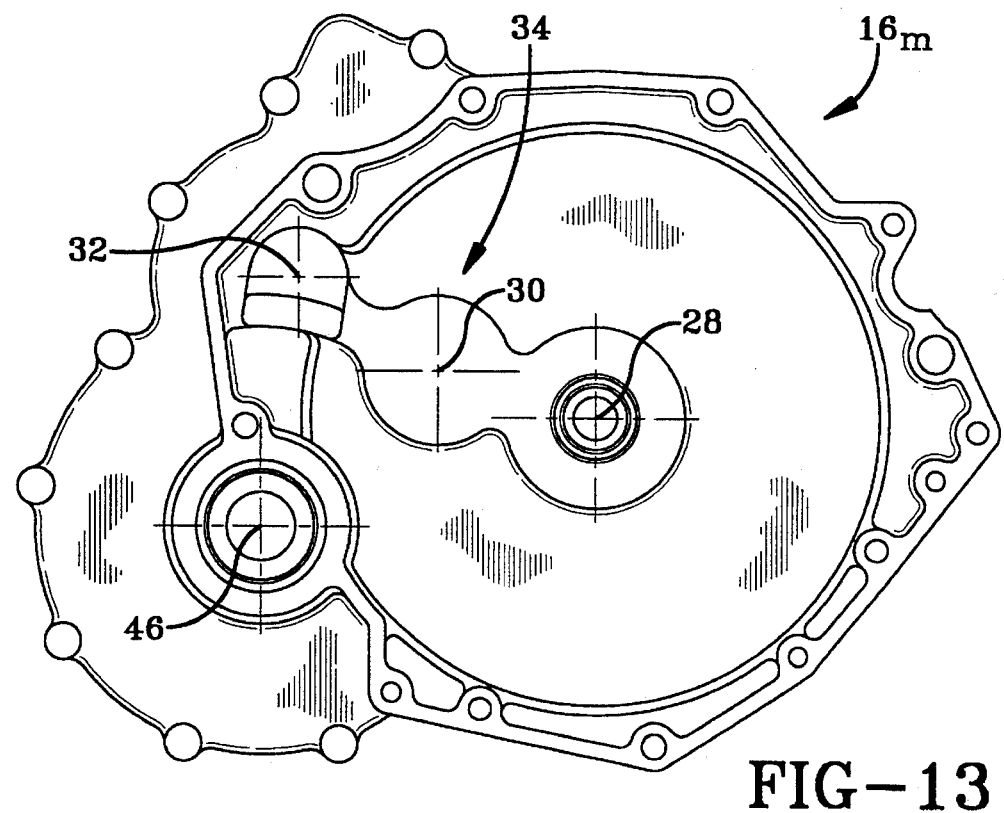
FIG. 13 is a front elevation of the bell housing depicted in FIG. 12.

In the automatic version of the transmission assembly $10_a$ depicted, the hub portion of a plurality of drive ratio selecting gears $56A_a$ through $56F_a$ (as best seen in FIGS. 7A–7C) are rotatably mounted on the input shaft $22_a$, the output shaft $24_a$ and the countershaft $26_a$. One or more transfer gears $58_a$ are mounted on the shafts $22_a$, $24_a$ and $26_a$ to rotate therewith by way of connecting splines 60. As shown, each transfer gear $58A_a$ through $58E_a$ is in meshing engagement with it corresponding drive ratio selecting gear $56A_a$ through $56E_a$ located on an adjacent shaft. In addition, each drive ratio selecting gear $56_a$ is operatively associated with a respective torque transfer device 62A through 62F, such as a hydraulically actuated clutch.

As depicted, and as is well known to the art, each torque transfer device 62 is fixedly secured to a particular shaft $22_a$, $24_a$ or $26_a$ and selectively engageable with an adjacent drive ratio selecting gear $56_a$ associated with that shaft on which the torque transfer device 62 is mounted. Those skilled in the art will recognize that when a particular torque transfer device 62 is actuated, the adjacent drive ratio selecting gear $56_a$ associated therewith comes into locking engagement with the particular shaft $22_a$, $24_a$ or $26_a$ on which the drive ratio selecting gear $56_a$ is supported, thereby permitting selective relative, or simultaneous, rotation of the drive ratio selecting gear $56_a$ with respect to the particular shaft on which that gear is supported.

It should be further noted that each of the shafts $22_a$, $24_a$ and $26_a$, in the transmission mechanism $14_a$ includes one or more fluid delivery passages 64 which provide fluid communication to the torque transfer devices 62 so as to permit selective actuation thereof. The necessary communication may be assured, for example, by fitting the rear cover $18_a$ with a plurality of cylindrical locating recesses 66 (FIGS. 7A–7C), each of which receive a cylindrical distribution block 68. The locating recesses 66A–66C are collocated within the array 34 such that each shaft $22_a$, $24_a$ and $26_a$ is aligned with its own distribution block 68A–68C, respectively. Appropriate transfer passages 70 extend through each distribution block 68 to communicate with the corresponding fluid delivery passages 64 in the shafts $22_a$, $24_a$ and $26_a$.

The rear cover $18_a$ may also be provided with a plurality of supply passages 72 that communicate between a control housing $74_a$ and the appropriate transfer passage 70 in the distribution block 68. The control housing $74_a$ may be demountably secured to a control mounting platform 76 on the central housing portion 20, as by a plurality of cap screws 78. The necessary pump and control devices may be contained within the control housing $74_a$ to effect selective actuation of the appropriate torque transfer devices 62 in the desired sequence, as is well known to the art.

Similarly, each shaft $22_a$, $24_a$ and $26_a$ includes at least one lubrication delivery passage 80 which is in continuous fluid communication with a lubricant reservoir and pump means (not shown) that may be contained in, or directed through, the control housing $74_a$. Here, too, appropriate lubricant transfer passages 82 may extend through the distribution blocks 68 to communicate with the lubrication delivery passages 80 in shafts $22_a$, $24_a$ and $26_a$. The rear cover $18_a$ may also be provided with a plurality of lubricant supply passages 84 that communicate between the control housing $74_a$ and the lubricant transfer passages 82 in the distribution blocks 68 to supply continuous lubrication to the interface between each drive ratio selecting gear $56_a$ and the shaft $22_a$, $24_a$ or $26_a$ on which those gears $56_a$ are rotatably supported.

Either frontal bell housing cover 16 (FIGS. 8 and 16) has a bore 86 which circumscribes the rotational operating axis 28 for the input shaft $22_a$ as well as a cylindrical journal box 88 that is aligned with the rotational axis 30 for the output shaft $24_a$ and that is recessed into the bell housing cover 16 itself. Similarly, a cylindrical journal box 90 is aligned with the rotational axis 32 for the countershaft $26_a$ and is also recessed into the bell housing cover 16. A hub 92 circumscribes the operating axis 46 of the differential output shaft 44 to receive a support bearing 94 for the transmission mechanism 14.

The exterior surface $96_a$ on the wall $98_a$ of the frontal housing cover $16_a$ for use in conjunction with the automatic transmission mechanism $14_a$ is recessed, as at $100_a$, to receive a bulkhead member 102 that may be affixed to the bell housing cover $16_a$, as by a plurality of bolts 104. The bulkhead member 102, as well as that portion of the wall $98_a$ to which the bulkhead member 102 is secured, must be sufficiently sturdy to withstand the high pressures used to actuate the starting or slipping input clutch $52_a$ that is typically employed with an automatic transmission mechanism $14_a$ operatively to connect the flywheel 106 that receives the output of the engine (not shown) to the input shaft $22_a$ of the transmission mechanism $14_a$.

With respect to FIG. 16, an annular recess $100_m$ is provided on wall $98_m$ of the frontal bell housing cover $16_m$ used in conjunction with the manual transmission mechanism $14_m$ to receive an annular actuating piston 108 (FIG. 14) that selectively displaces the unsupported edge 110 (FIG. 15A) of a Belleville spring 112 which operates the input clutch $52_m$ that is typically employed with a manual transmission mechanism $14_m$ operatively to connect the flywheel 106 that receives the output of the engine (not shown) to the input shaft $22_a$ of the transmission mechanism $14_m$.

To conclude the description of the automatic transmission $14_a$, the reverse/idler gear 36 (FIGS. 6 and 7C) is in meshing engagement with a drive ratio selecting gear $56F_a$ mounted on the countershaft $26_a$. As such, when the drive ratio selecting gear $56F_a$ is actuated by its corresponding torque transfer device 62F in the automatic transmission assembly $10_a$, the reverse/idler gear 36 is driven.

The final drive differential mechanism 42 is in meshing engagement with the output shaft $24_a$ and is, accordingly, driven at a speed commensurate therewith.

Those skilled in the art will, without further detailed discussion, recognize that the drive components, briefly described above, act in driving communication with one another to transmit power from the input clutch $52_a$ to the final drive differential mechanism 42 in a manner typical of conventional automatic multi-speed, countershaft transmissions.

With particular reference to FIG. 14, the transmission assembly $10_m$ includes a manual shifting transmission mechanism $14_m$. It should be apparent from the drawings that the overall configuration depicted is very similar to the automatic transmission mechanism $14_a$ that was briefly described in the preceding paragraphs.

Accordingly, the central housing portion 20 may be employed without modification for either the manual or the automatic shifting configuration, the length (labelled "L") of the central housing portion 20 remaining the same for either shifting configuration. In the manual configuration, the central housing portion 20 is fitted with a plurality of drive shafts $22_m$, $24_m$ and $26_m$ which are also journaled in the transverse web wall 48 by a plurality of main support bearings 50. The bearings 50, accordingly, occupy the same axial bearing locations in the casing assembly $12_m$ as do the bearings 50 utilized in the casing assembly $12_a$ previously described herein. The casing assembly $12_m$ further includes a bell housing cover $16_m$ which may be demountably secured to the central housing portion 20 by a fastening means in the nature of a plurality of machine bolts 54.

The bell housing cover $16_m$ may receive an input clutch $52_m$ of the type that is typical for conventional manual transmissions and which serves operatively to connect the flywheel 106 that receives the output of the engine (not shown) to the input shaft $22_m$ of the transmission mechanism $14_m$. The input shaft $22_m$, an output shaft $24_m$ and a countershaft $26_m$ are located in the same array 34 as are the corresponding shafts in the transmission mechanism $14_a$. The shafts $22_a$, $24_m$ and $26_m$ are, therefore, also all located on the same rotational operating axes 28, 30 and 32, respectively, as were the corresponding shafts $22_a$, $24_a$ and $26_a$ in the casing assembly $12_a$. As such, the ordinate and abscissa dimensions by which to delineate the position of each shaft in the array 34 of the manual transmission assembly $10_m$ are identical to those same dimensions in the automatic transmission assembly $10_a$ of the transmission family to be housed in the interchangeable central housing portion 20 of the casing assembly $12_a$ or $12_m$.

A plurality of drive ratio selecting gears $56A_m$ through $56F_m$ and transfer gears $58A_m$ through $58F_m$ are mounted on the shafts $22_m$, $24_m$ and $26_m$ in operative meshing engagement to provide a six speed transmission assembly $10_m$. The primary difference between the automatic and manual version lies in the mechanism by which the drive ratio selecting gears $56_m$ are selectively driven by the shafts on which they are supported. As previously described, the automatic version utilizes hydraulically actuated torque transfer devices 62 in the nature of clutches which are selectively actuated by electronic solenoids (not shown) that may be located in the control housing $74_a$.

The manual version, however, utilizes conventional mechanical synchronizers 114A through 114F to actuate each drive ratio selecting gear $56A_m$ through $56F_m$. The synchronizers 114 of the manual transmission version, and the torque transfer devices 62 of the automatic transmission version, occupy generally common locations within the casing assembly $12_m$ or $12_a$, respectively. The synchronizers 114 are selectively actuated by shift paddles (a portion of which is designated at 116) which mechanically link each synchronizer 114 to the well known operating mechanism within the control housing $74_m$—more commonly designated as a shift tower when describing manual transmission controls—that is demountably secured to the control mounting platform 76 provided on the central housing portion 20, as by a plurality of caps screws 78.

The use of manually actuated synchronizers 114 eliminates the need for hydraulic fluid delivery passages 64 in the shafts $22_m$, $24_m$ or $26_m$. However, lubrication delivery passages 80 are still desirable to assure distribution of the necessary lubricant to the hub portion of the drive ratio selecting gears $56_m$ as well as the synchronizers 114.

At this point, it should be explained that the geometry of the paddle mechanism utilized to effect the desired interaction with the appropriate synchronizer 114 may be adapted to be contained within the control housing $74_m$, so that the latter may still be secured to the control mounting platform 76. Accordingly, either control housing 74 may be demountably received on the central housing portion 20 without modification of the central housing portion.

The reverse/idler gear 36 and the final drive differential assembly 40 for the manual version of the transmission assembly $10_m$ may be identical to that employed in the automatic version of the transmission assembly $10_a$. Further, the reverse/idler operating axis 38 and differential output operating axis 46 of the manual version of the transmission mechanism $14_m$ are identically located within the common geometric array 34. As such, synchronizer 114F may be operated selectively to connect the drive ratio selecting gear $56G_m$—which meshingly engages the reverse/idler gear 36—to the countershaft $26_m$ in order to effect operation in the reverse drive range.

Thus, it can be seen that a family including both manual and automatic transmission mechanisms can be assembled within a common interchangeable central housing portion 20 to permit flexible assembly of both types of transmission. In addition, it has been found that as much as seventy-five percent (75%) of the machining operations required to fabricate a casing assembly 12 that will receive a family of manual and automatic transmission mechanisms may be identical. Moreover, the use of a family of transmission mechanisms that are adapted to be received in casing assemblies embodying the concepts of the present invention may well require a twenty percent (20%) reduction in plant and equipment investment when compared to the use of similar, but unique, transmission designs in separately designed casing assemblies, making it possible to utilize the present invention to produce low volume transmission assemblies $10_a$ or $10_m$ at competitive costs to higher volume transmission assemblies fabricated in two, dedicated production facilities.

The transmission assemblies $10_a$ and $10_m$ further enable a responsive flexible manufacturing system efficiently to respond to market-share variations in automatic and manual transmission demands. The common features of the transmission assemblies $10_a$ and $10_m$ also allow common manufacturing processes and the use of common manufacturing equipment. In addition, the common case lengths for both the automatic and the manual transmissions allow usage of common work-holding and transfer equipment. The basic end-cover geometry which is common with both types and the shaft center distances (within the common array) and the common axial locations for the bearing bores required for both transmission types in the family also contribute to the success of the present invention. Additionally, the use of a single control mounting platform on the central housing portion 20 that is common to both casing assemblies $12_a$ and $12_m$ is enabled by the common center distances of the supporting shafts and the common case lengths.

In particular, the total interchangeability of the central housing portion 20 permits at least that item to be machined along a single processing line for both automatic and manual versions. The similarity of the rear cover and the bell housing cover for both the manual and the automatic versions of the transmission assemblies is sufficient to allow for common pallet and clamping fixtures. The commonly fixtured components of the casing assemblies may thus be presented to a single machine that generates the shaft bores, or the cylindrical bearing boxes, as well as any register dowel locations, thereby assuring control of center line locations. Hence, even the frontal bell housing covers $16_a$ or $16_m$ and the rear covers $18_a$ or $18_m$ can, to a great degree, be machined on common processing lines.

The economics of using a single fabricating facility to assemble parts having such a high degree of commonality allows the introduction of transmission products at a lower cost, relative to the traditional two-facility, dedicated approach. The flexibility between manual and automatic versions also allows for market shifts in the demand for manual and automatic transmissions. It has further been found that transmission assemblies incorporating the concepts of the present invention and produced in a single flexible system enables the use of five speed automatic and six speed manual transmissions which fit in existing packaging envelopes. The increased number of drive ratios will allow an increase in performance while maintaining fuel economy improvements associated with the use of an input starting clutch. It has been found that these transmission assemblies are further able to meet the demands for reduced cost, high fuel economy, improved packaging, reduced production costs, reduced weight and high driving comfort.

In view of the foregoing, it should be apparent that the transmission assembly described hereinabove accomplishes the objects of the invention and generally improves the art.

The embodiments of the invention in which an exclusive property or privilege is claimed are defined as follows:

1. A casing assembly adapted to receive a vehicular transmission mechanism selected from a family of automatic and manual versions, comprising:

an input operating axis in each version of automatic and manual transmission mechanisms;

an output operating axis in each version of automatic and manual transmission mechanisms;

a countershaft operating axis in each version of automatic and manual transmission mechanisms;

a reverse/idler operating axis in each version of automatic and manual transmission mechanisms;

the geometric array of said operating axes being common to both said automatic and manual transmission arrangements;

the casing assembly being provided with a plurality of mounting axes corresponding to said plurality of operating axes in said family of transmission mechanism;

said mounting axes of the casing assembly having a geometric array that is congruent with the geometric array of said operating axes in said family of automatic and manual transmission mechanisms.

2. A casing assembly as set forth in claim 1, further comprises:

a central housing portion;

one or more cover members demountably attached to said central housing portion;

said cover members matingly received on said central housing portion;

said cover members provided with a plurality of bearing boxes;

said bearing boxes disposed in a geometric array that is congruent with the geometric array delineated by said operating axes.

3. A casing assembly as set forth in claim 2, wherein said casing assembly further comprises:

a length for said central housing portion that is common for both manual and automatic shifting configurations.

4. A casing assembly as set forth in claim 3, wherein said casing assembly further comprises:

a bell housing demountably attached to said central housing portion; and, an end cover plate demountably attached to said central housing portion.

5. A casing assembly as set forth in claim 4, wherein said casing assembly further comprises:

a control mounting platform integrated with said central housing portion.

6. A casing assembly adapted to receive a vehicular transmission mechanism selected from a family of automatic and manual versions having an input shaft member, an output shaft member, a countershaft member and a reverses/idler shaft member that are oriented along parallel operating axes and that are disposed in a geometric array which is common to both the automatic and the manual arrangements, said casing comprising:

a central housing portion;

an input supporting axis defined within said central housing portion;

an output supporting axis defined within said central housing portion;

an idler supporting axis defined within said central housing portion;

a reverse/idler supporting axis defined within said central housing portion;

said supporting axes being disposed in a geometric array that is congruent to the geometric array of said operating axes.

7. A casing assembly, as set forth in claim 6, further comprising:

a transverse web wall within said central housing portion of said casing assembly;

said supporting axes penetrating said web wall.

8. A casing assembly, as set forth in claim 7, further comprising:

a plurality of transfer gears secured to the shafts to rotate therewith;

a plurality of drive ratio selecting gears rotatably mounted on the shafts;

means for selectively connecting said drive ratio selecting gears to the shafts;

a transmission control means suitable for the mode of operation selected; and, a control housing included on said case and adapted matingly to receive said transmission control means.

9. A combination, as set forth in claim 8, wherein said casing assembly further comprises:

a length for said central housing portion that is common for both manual and automatic shifting configurations.

10. A combination, as set forth in claim 9, wherein said casing assembly further comprises:

a bell housing demountably attached to said central housing portion; and, an end cover plate demountably attached to said central housing portion.

11. A combination, as set forth in claim 10, wherein said casing assembly further comprises:

a control mounting platform integrated with said central housing portion.

12. A family of transmission assemblies including both manual and automatic shifting arrangements and utilizing a casing assembly having an interchangeable central housing portion and a plurality of common components for both manual and automatic modes of operation, each transmission assembly comprising:

an input shaft;

an output shaft;

a countershaft;

a reverse/idler shaft;

said shafts being disposed in a geometric array common to any transmission assembly included in said family;

transfer gears carried on said shafts to be continuously rotatable therewith;

a plurality of drive ratio selecting gears rotatably supported on said shafts;

means selectively connecting each said drive ratio selecting gear to the shaft on which that drive ratio selecting gear is mounted;

means for receiving input power to deliver said power at output drive ratios selected in accordance with the mode of operation;

a casing assembly for housing at least said shafts and the supported thereon in said geometric array.

13. A family of transmission assemblies, as set forth in claim 12, further comprising:

control means for operating said drive ratio selecting gears in conformity with the selected mode of operation;

a control housing to receive said control means; and, a control mounting platform presented from said casing assembly to be engaged by said control housing.

14. A combination, as set forth in claim 13, wherein said casing assembly further comprises:

a central housing portion;

one or more cover members demountably attached to said central housing portion;

said cover members matingly received on said central housing portion;

said cover members provided with a plurality of bearing boxes;

said bearing boxes disposed in a geometric array that is congruent with the geometric array delineated by said operating axes.

15. A combination, as set forth in claim 14, wherein at least one said end cover member further comprises:

fluid passage means;

said fluid passage means in one of said cover members communicating with corresponding fluid passage means in said shafts.

16. A combination, as set forth in claim 14, wherein:

mechanically actuated synchronizers selectively connect said drive ratio selecting gears with the shaft on which each is supported in the manual shifting arrangements of said transmission mechanism.

17. A combination, as set forth in claim 14, wherein:

hydraulically actuated torque transfer devices selectively connect said drive ratio selecting gears with the shaft on which each is supported in the automatic shifting arrangements of said transmission mechanism.

\* \* \* \* \*